United States Patent [19]
Oshima

[11] Patent Number: 5,946,424
[45] Date of Patent: Aug. 31, 1999

[54] METHOD FOR RECONSTRUCTING A SHAPE AND AN APPARATUS FOR RECONSTRUCTING A SHAPE

[75] Inventor: Mitsuo Oshima, Tokyo, Japan

[73] Assignee: Oki Electric Industry Co., Ltd., Tokyo, Japan

[21] Appl. No.: 08/813,319

[22] Filed: Mar. 10, 1997

[30] Foreign Application Priority Data

Aug. 14, 1996 [JP] Japan .................................. 8-214783

[51] Int. Cl.$^6$ ...................................................... G06K 9/32
[52] U.S. Cl. .......................... 382/293; 382/151; 382/154; 382/203; 348/42; 348/51; 348/54; 348/297; 356/12
[58] Field of Search .................................. 382/293, 203, 382/151, 154; 348/51, 42, 54, 297; 356/12

[56] References Cited

U.S. PATENT DOCUMENTS

| | | | |
|---|---|---|---|
| 3,964,822 | 6/1976 | Yamashita | 350/117 |
| 5,432,543 | 7/1995 | Hasegawa et al. | 348/45 |
| 5,493,427 | 2/1996 | Nomura et al. | 359/40 |
| 5,671,028 | 9/1997 | Okano | 349/66 |
| 5,712,732 | 1/1998 | Street | 359/630 |

OTHER PUBLICATIONS

"Reconstruction of 3D Orientation of Skin Surface Replicas by Expanding Photometric Stereo", The Transactions of the Institute of Electronics, Information, and Communication Engineers of Japan, Part D–II No. 9 pp. 1797–1805, Sep. 1994.

"Photometric Stereo by Simultaneous Illumination with Three Colored Lights", The Transactions of the Institute of Electronics, Information, and Communication Engineers of Japan, Part D–II vol. J76–D–II No. 10 pp. 2243–2246, Oct. 1993.

"Recovery of Curved Surfaces from Stereo of Isoluminance Contours", The Transactions of the Institute of Electronics, Information, and Communication Engineers of Japan, Part D–II, vol. J77–D–II No. 9 pp. 1673–1679, Sep. 1994.

"Binocular Shading and Visual Surface Reconstruction", Computer Vision, Graphics, and Image Processing 28, pp. 19–43 (1984).

"Shape from Interreflections", IEEE 1990 pp. 2–11.

Reconstruction of Curved Surface Using Isodensity Maps Based on Stereo Vision System, SPIE vol. 2249, Automated 3D and 2D Vision (1994), pp. 243–253.

*Primary Examiner*—Leo H. Boudreau
*Assistant Examiner*—Kanji Patel
*Attorney, Agent, or Firm*—Rabin & Champagne P.C.

[57] ABSTRACT

An object of the invention is to provide a method for easily determining an integral interval when detecting inclinations of a subject in pixel units and reconstructing a shape of said subject by integrating said detected inclinations. This method photographs the subject with a left camera and a right camera, and obtains gradational images from the respective positions. This method obtains in pixel units parallaxes for the subject between these positions. This method determines as one integral interval each domain in which pixels showing the same parallax appear in succession.

10 Claims, 9 Drawing Sheets

Left gradational image

Right gradational image

Information inside
the parallax storing means

Pixel number

Pixel number

METHOD FOR RECONSTRUCTING A SHAPE AND AN APPARATUS FOR RECONSTRUCTING A SHAPE

BACKGROUND OF THE INVENTION

1. Field of the Invention

The present invention relates to a method for reconstructing a shape of a subject and an apparatus suitable for implementing this method.

2. Description of the Related Art

As an example of a method for detecting surface inclinations of a subject in pixel units and reconstructing a shape of the subject by integrating the detected inclinations, there is a method disclosed in reference I "THE TRANSACTIONS OF THE INSTITUTE OF ELECTRONICS, INFORMATION, AND COMMUNICATION ENGINEERS OF JAPAN, PART D-II Vol. J77-D-II No. 9 pp.1797–1805, September 1994". This method obtains plural images of a subject by photographing said subject from a fixed position as changing only the direction of a light source. Next, it detects surface inclinations of said subject in pixel units from pairs of luminances of arbitrary pixels corresponding to each other in these images. And it reconstructs a shape by integrating the detected inclinations (see "lines 1 to 9 in the left column of p. 1798 of the reference I"). When performing this integration, it is necessary to determine integral intervals. This is for the purpose of distinguishing a subject as an object of photographing from its background.

As a method for determining an integral interval, there have been up to now (a) a method of separating an integral interval from an image by means of a two-level process or the like (see "Line 5 from the bottom of p. 1799 of the reference I") and (b) a method of identifying an integral interval by comparing a subject with a reference object on the basis of a reflectivity map and estimating a domain different in reflectivity from an estimated error value of a pixel normal vector (see "Line 4 of p. 1799 to line 1 of p. 1800 of the reference I").

And for performing the integration, a method has been adopted (1) which uses the brightest point in an image as an initial value for the integration (see "Lines 9 and 10 of p. 1800 of reference I") or (2) which performs integration after obtaining an integration starting point to minimize an error of an initial inclination value (see reference II "THE TRANSACTIONS OF THE INSTITUTE OF ELECTRONICS, INFORMATION, AND COMMUNICATION ENGINEERS OF JAPAN", Part D-II Vol. J76-D-II No. 10, line 28 or later in the left column of p. 2244).

And in order to suppress accumulation of integral errors when performing the method (2), a method is also adopted which computes average values of depth as weighting with estimated errors (see "Lines 19 and 20 in the left column of p. 1800 of reference I"). And in order to reduce an integral error, a method is also adopted which selects an integral path (see "Line 3 or later from the bottom of the left column of p. 2244 of reference II").

However, in case of performing a two-level process for determining an integral interval, there is a high possibility that domains different in color on a subject having various colors are treated as different integral intervals. And furthermore, in case that an edge of the subject cannot be successfully caught when performing a two-level process, since an error happens in determining an integral interval and the error is superposed on the integration, reconstruction of a shape cannot be successfully performed. In case of adopting a process of using a reflectivity map when determining an integral interval, it is laborsome to prepare the reflectivity map. And in case of adopting any of a process of obtaining the brightest point as an integration starting point and a process of obtaining an integration starting point to minimize an error of an initial inclination value, the process is very laborsome. And these laborsome processes require an apparatus of complicated composition. In case of adopting a method of weighting with estimated errors in order to suppress accumulation of integral errors, there is a possibility that an integral distortion is caused by suppression of the estimated errors. And it is not easy to select an integral path capable of reducing an integral error, and integrated values are made different depending upon the selected paths.

It is therefore an object of the invention is to provide a new method for making it easier to determine an integral interval required for reconstructing a shape, and an apparatus suitable for implementing the method.

SUMMARY OF THE INVENTION

The inventors of the present invention have repeated various studies. As a result, the inventors have paid attention to a point that generally photographic objects whose shapes are desired to be reconstructed often exist dispersedly in the direction of distance (the direction from a point of view toward the subjects). Furthermore, the inventors have paid attention to a point that a photographic object often stays within a certain range of distance in the direction of distance (a certain range of depth in other words). Here, that a photographic object stays within a certain range of distance in the direction of distance means that parallaxes in case of photographing an object, for example, by means of a twin-lens stereoscopic apparatus stay also within a certain range. Reversibly speaking, it can be thought that a group of pixels in an image obtained by photographing a subject, for example, by means of a twin-lens stereoscopic apparatus which pixels are in parallax within a specified range is a group of pixels to be photographed as one object, and therefore this group of pixels may be considered as one integral interval.

From these matters, according to a first aspect of the present invention, there is provided a shape reconstructing method for detecting inclinations of a subject in pixel units and reconstructing a shape of said subject by integrating said detected inclinations, said shape reconstructing method which photographs said subject from at least two different positions, obtains a parallax for said subject in pixel units between these positions, and determines an integral interval for said integration on the basis of said parallax.

Here, to determine an integral interval on the basis of parallax can mean typically to consider as one integral interval each domain in which pixels showing the same parallax appear in succession. In this case, the same parallax means, for example, that a domain where pixels having parallax 5 appear in succession is considered as one integral interval, a domain where pixels having parallax 3 appear in succession is considered as one integral interval, and a domain where pixels having parallax Q (where Q is an arbitrary integer) appear in succession is considered as one integral interval.

Furthermore, this includes also a case that a domain where pixels, for example, having parallaxes 2 to 4 appear in succession is considered as one integral interval. Namely, this includes also a case that a domain where pixels whose parallaxes stay within a certain range appear in succession is considered as one integral interval.

According to this shape reconstructing method, since an integral interval is determined as paying attention to parallax, it is possible to make unnecessary a two-level process or a reflectivity map for determining an integral interval as required in the prior art. And, for example, since one end of a domain where pixels having the same parallax appear in succession can be set as an integration starting point as it is, this method dispenses with computation of the brightest point or an integration starting point as required in the prior art. And it is possible to easily determine as an integral path, for example, a path along the column direction or the row direction of a pixel group in an integral interval as determined above.

An integrating process in implementing this invention is preferably a process which performs integration from one end of an integral interval to the other end, performs integration also in the direction reverse to that direction, takes an average value of integrated values of pixels having the same pixel number as each other for the results of integration in both directions, and takes said average value as a proper result of the integration. The reason is that there is a disadvantage that a final error becomes great since errors are accumulated by integration. Errors added to integrated results at the initial stage of integration and errors at the final stage are different in size from each other. Thereupon, when performing integration from two directions opposite to each other and taking as a final integrated result an average of integrated results of pixels having the same pixel number as each other, since integral errors can be uniformly distributed in the integrated result, unbalance in distribution of integral errors is reduced. Therefore, it is thought that deterioration in reconstruction of a shape caused by integral errors can be reduced.

In case of implementing the invention, detection of inclinations of a subject in pixel units can be performed by means of any preferable method such as a so-called luminance difference stereoscopic method described in the said reference I, a method using a distance information which is not shown by a reference, or the like.

In case of implementing the invention, however, it is preferable to detect said inclination of each pixel on the basis of a luminance ratio of pixels corresponding to each other which are obtained from images of the same subject seen from said different positions (hereinafter referred to as also "a luminance ratio of the corresponding pixels"). The reason is that in case of obtaining a surface inclination of a subject by means of an existing method disclosed in reference I for example, such a problem happens that since plural lighting directions are required for the subject, it is necessary to prepare a reflectivity map after limiting a light source and a material for the subject, that the subject is limited, or that composition of a detecting apparatus is complicated. However, this preferable example can avoid such a problem.

Furthermore, this preferable example has also an advantage that an inclination can be detected by utilizing a means for obtaining a parallax and an image obtained at that time as they are.

According to a second aspect of the invention, there is provided a shape reconstructing apparatus comprising;

an inclination detecting means for detecting inclinations of a subject in pixel units, an image inputting means for photographing said subject from at least two different positions and obtaining images of said subject seen from the respective positions, a means for obtaining in pixel units parallaxes for said subject between the images obtained by said image inputting means, an integral interval determining means for determining as an integral interval each domain in which pixels showing the same parallax appear in succession, and an integrating means for integrating inclinations corresponding to a group of pixels within said determined integral interval.

According to this shape reconstructing apparatus, the invention of said shape reconstructing method can be easily implemented.

In case of implementing the invention of this shape reconstructing apparatus, said integrating means may comprise a specified first integrating means, a second integrating means, and an averaging means. The reason is that by doing this, from the same reason as described in explanation of the invention of said method, unbalance of integral errors is reduced.

In case of implementing the invention of this shape reconstructing apparatus, said inclination detecting means may include of an optional preferable means such as a means used in an illuminance-difference stereoscopic method disclosed in reference I, for example. It is preferable that said inclination detecting means is a means for detecting an inclination on the basis of a subject luminance ratio of pixels corresponding to the same part on said subject in the respective images obtained by photographing said subject from said different positions. The reason is that as described in explanation of the invention of said method, in case of obtaining an inclination of a subject by means of an existing method disclosed in reference I, such a problem happens that it is necessary to prepare a reflectivity map after limiting a light source and a material for the subject, that the subject is limited, or that composition of a detecting apparatus is complicated. However, this preferable example can avoid such a problem. Furthermore, this preferable example can detect an inclination by utilizing a means for obtaining a parallax and an image obtained at that time as they are.

BRIEF DESCRIPTION OF THE DRAWINGS

The foregoings and other objects, features and advantages of the present invention will be better understood from the following description taken in connection with accompanying drawings, in which:

FIG. 1, comprising FIG. 1(A) is a block diagram of a reconstruction apparatus according to the present invention and FIG. 1(B) is a diagram for explaining relation between a subject and two cameras provided on an image inputting means.

FIG. 2, comprising

FIG. 4, comprising

FIG. 5, comprising

FIG. 8, comprising

DESCRIPTION OF THE PREFERRED EMBODIMENTS

With reference to the drawings, descriptions will be given to embodiments of a shape reconstructing method and a shape reconstructing apparatus of the present invention. The drawings used in the explanations are only shown so roughly as to understand the invention. And the same numbers are given to the corresponding components in figures and the duplicate explanations are sometimes omitted. In the following embodiments, an example is described where a subject is photographed from two different positions (where a twin-lens stereoscopic apparatus is used).

1. First Embodiment 1-1. Apparatus

Figure 1A:
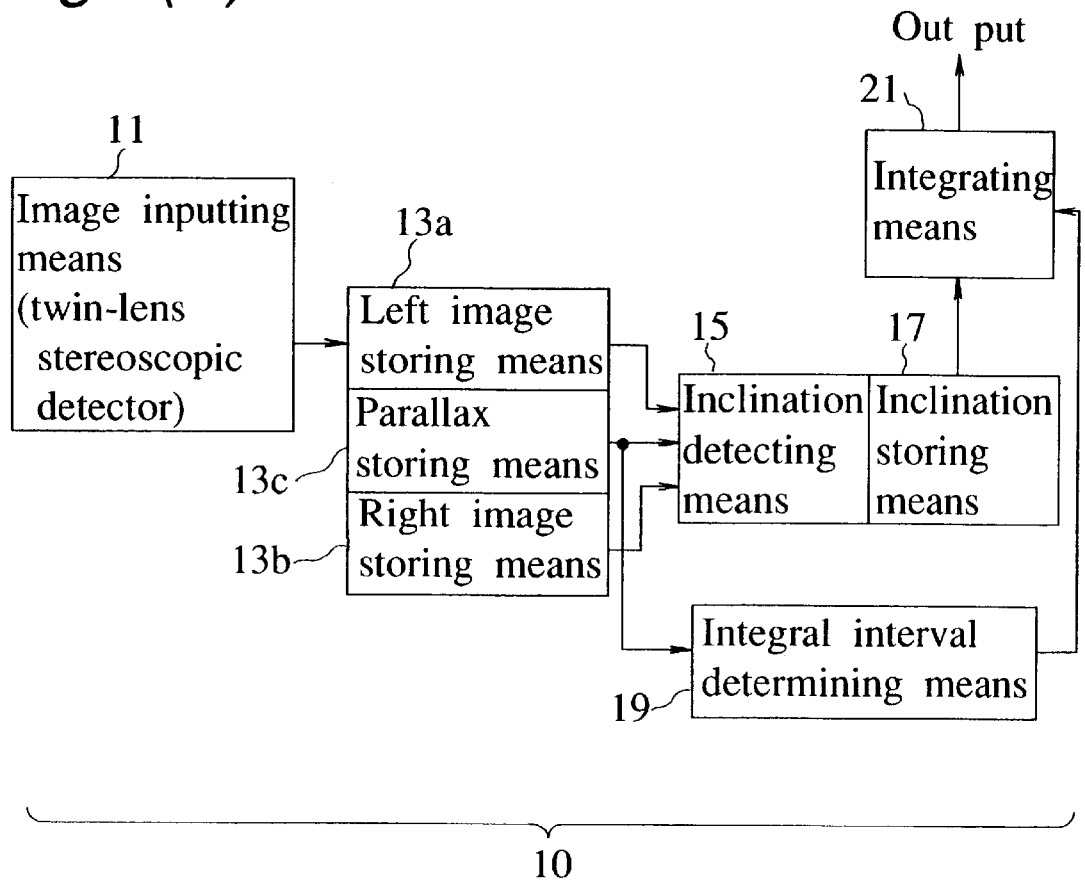
FIGS. 1(A) and 1(B), is a drawing for explaining an apparatus according to a first embodiment.
Figure 1B:
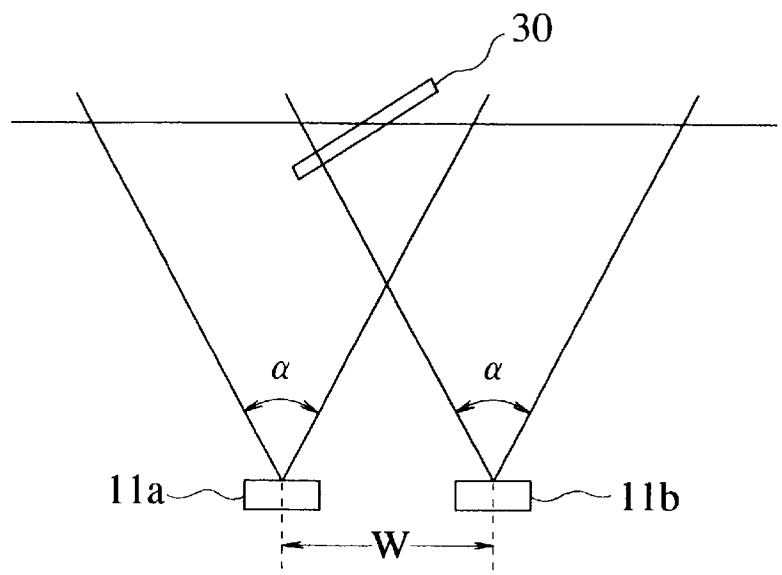

FIG. 1(A) is a block diagram for showing a shape reconstructing apparatus 10 according to a first embodiment, and FIG. 1(B) is a figure showing an arrangement example of a subject 30 and cameras 11a and 11b provided on the apparatus 10. Although FIG. 1(B) shows the subject 30 like a flat plate, this is only an example.

In FIG. 1, a twin-lens stereoscopic detector 11 as an image inputting means is provided with two cameras 11a and 11b, and a corresponding pixel finding means (also called a corresponding point finding means, not illustrated). The two cameras 11a and 11b (hereinafter also referred as to a left camera 11a and a right camera 11b) are arranged against the subject 30 so that their optical axes may be in parallel with each other and at a distance W, not limited to this, from each other. Gradational images (or luminous-density images) are obtained by photographing the subject 30 from two different positions by means of the cameras 11a and 11b. These cameras 11a and 11b can be composed of CCD (charge coupled device) cameras, for example. The unillustrated corresponding pixel finding means is a means for finding what pixel position in a gradational image obtained by the right camera 11b (hereinafter also referred to as a right image) corresponds to the pixel position of a pixel in a gradational image obtained by the left camera 11a (hereinafter also referred to as a left image) (and/or for finding the reverse correspondence to this). Such a twin-lens stereoscopic detector 11 can be composed by a technique disclosed for example in reference III ("Reconstruction of a curved surface by means of stereoscopy of isoluminance lines" by Ishiyama and Tomita in "THE TRANSACTIONS OF THE INSTITUTE OF ELECTRONICS, INFORMATION, AND COMMUNICATION ENGINEERS OF JAPAN, PART D-II Vol. J77-D-II No. 9, pp.1673–1679, September 1994").

In FIG. 1, number 13a is a left image storing means, number 13b is a right image storing means, and 13c is a parallax storing means. The left image storing means 13a is a means for storing a gradational image obtained by photographing a subject by means of the left camera 11a. The right image storing means 13b is a means for storing a gradational image obtained by photographing a subject by means of the left camera 11b. A gradational image is typically the information representing a luminous-density distribution of a subject with multi-value digital signals. And the gradational image can be treated as the information representing a luminous-density distribution of each color of R (red), G (green), and B (blue) with multi-value digital signals. And the parallax storing means 13c is a means for storing a parallax between pixels found by the said corresponding pixel finding means, namely, between pixels corresponding to the same part of the subject in the left and the right image. Here, it is assumed that a parallax is shown by a coordinate difference between pixels corresponding to the same part on the subject 30 in the left and the right image (hereinafter also referred to as the corresponding pixels) (this is described in detail later with reference to FIG. 2). This parallax storing means 13c stores parallaxes in pixel units.

And in FIG. 1, number 15 is an inclination detecting means. The inclination detecting means 15 detects inclinations of the subject 30 in pixel units on the basis of images obtained by photographing the subject 30. The inclination detecting means 15 in this case is assumed to be a means for detecting an inclination on the basis of a luminance ratio of luminances of pixels corresponding to each other in the left and the right image obtained from the subject. In detail, the inclination detecting means 15 in case of this embodiment is assumed to compute an inclination on the basis of Lambert's cosine law (in detail described later). In case that each of the left and the right image is an image information representing a density distribution of each color of R (red), G (green), and B (blue) with multi-value digital signals, it is preferable that the inclination detecting means 15 extracts from each pixel a luminance of the same color as a color which is the greatest in luminance among colors of pixels corresponding to each other and computes a luminance ratio on the basis of such luminances. Concretely speaking, for example, in case that the R (red) in the left image is the greatest in luminance among six luminances in total for three colors of the corresponding pixels in each of the left and the right image, the inclination detecting means 15 extracts a luminance for red from each of the corresponding pixels of both of the left and right image and obtains a luminance ratio for them. Such a method can improve an inclination detection in accuracy since it can reduce influence of noises.

In FIG. 1, number 17 is an inclination storing means. This is a means for storing in pixel units inclinations of pixels of the subject detected by the inclination detecting means 15.

And in FIG. 1, number 19 is an integral interval determining means. The integral interval determining means 19 determines as one integral interval a domain in which pixels showing the same parallax appear in succession.

Furthermore, in FIG. 1, number 21 is an integrating means. The integrating means 21 reads from the inclination storing means 17 inclinations corresponding to a group of pixels within an integral interval determined by the integral interval determining means 19 and stores the inclinations.

These components 13a, 13b, 13c, 15, 17, 19, and 21 can be, for example, formed by means of a computer.

1-2. Shape Reconstructing Method

Next, a process for reconstructing a shape according to a shape reconstructing method of the present invention is described in the following together with operation of the apparatus 10 explained with reference to FIG. 1.

First, a subject 30 is photographed by means of the two cameras 11a and 1b of the stereoscopic detector 11. By this, gradational images seen from the respective positions of the two cameras 11a and 11b are obtained. Photographing can be performed consecutively, but since the gist of the invention can be explained by a pair of stereoscopic images in this case, an example of using only a pair of images is described.

Figure 2A:
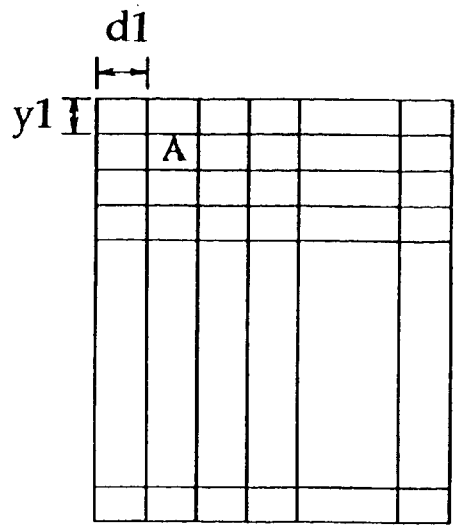
FIGS. 2(A), 2(B) and 2(C), is a drawing for explaining a process for making left and right images correspond to each other and a parallax.
Figure 2B:
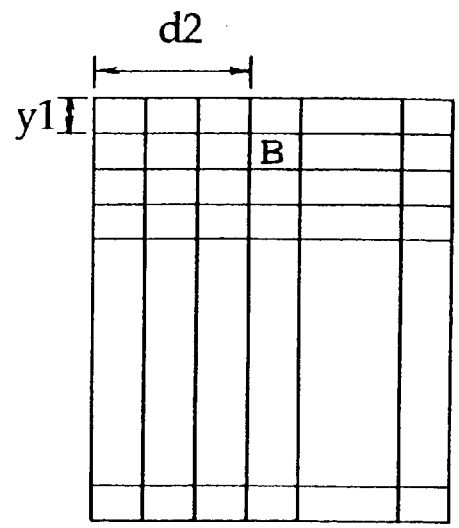
Figure 2C:
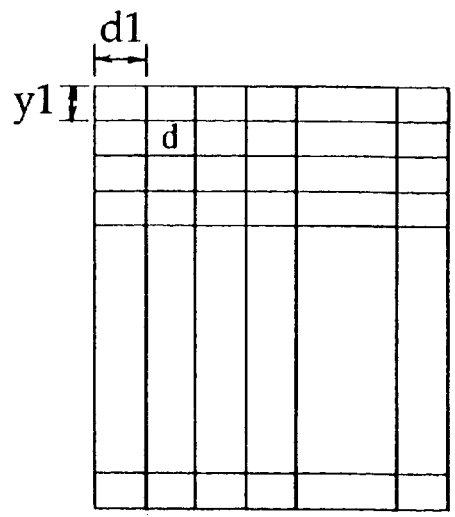

Photographed stereoscopic images (a left image and a right image) are respectively outputted to and stored into the left image storing part 13a and the right image storing part 13b as they are, and at the same time the corresponding pixels of the left and the right image by the twin-lens stereoscopic detector 11 are found and a parallax (also called a phase difference) is extracted. Extraction of a parallax is concretely described with reference to FIGS. 2(A) to 2(C). FIG. 2(A) is a figure schematically showing a state inside the left image storing part 13a, FIG. 2(B) is a figure schematically showing a state inside the right image storing part 13b, and FIG. 2(C) is a figure schematically showing a state inside the parallax storing part 13c. A corresponding pixel retrieving means not illustrated scans respectively the insides of the left image storing part 13a and the right image storing part 13b. At this time, the corresponding pixel retrieving means finds the corresponding pixels in the left and the right image as detecting, for example, whether or not image parts whose gradations vary in the same way as each other have appeared. FIGS. 2(A) and 2(B) show an example where a pixel "A" at a position (d1, y1) from the origin in the left image and a pixel "B" at a position (d2, y1) from the origin in the right image correspond to each other. According to this, the information given by "d=d2−d1", namely, parallax d which is a coordinate difference between pixels corresponding to each other in the left and the right image is stored at a position (d1, y1) of the parallax storing means 13c. In the same manner as described above, a parallax is obtained for each of the pixels in the left and the right image. It is a matter of course that a parallax may be extracted by using β the right image as the reference image.

Figure 3A:
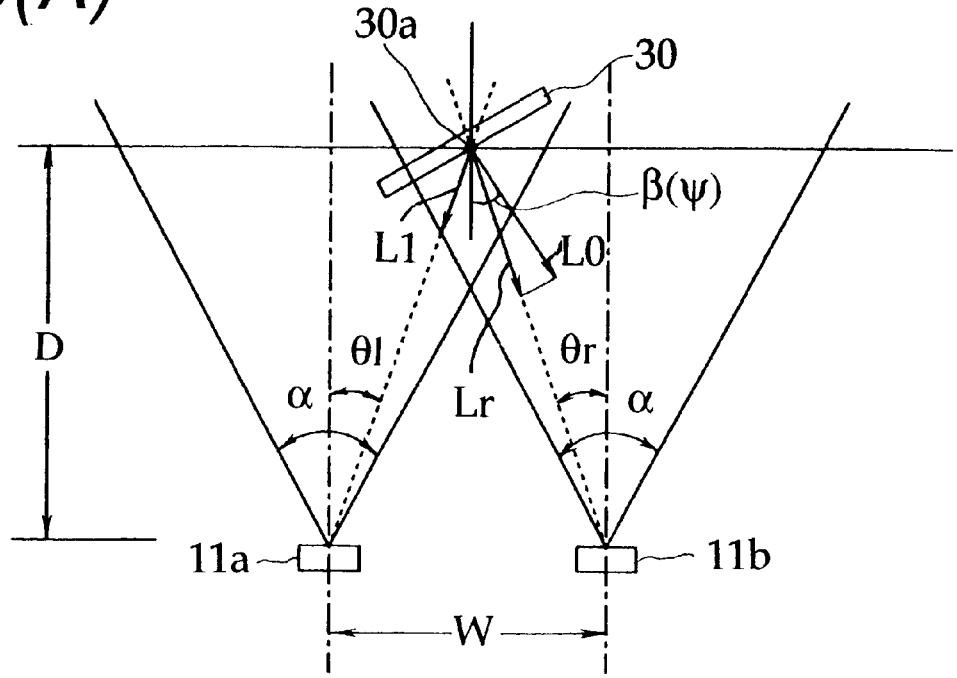
FIGS. 3(A) and 3(B), is a diagram for explaining a luminance ratio computing process and an inclination detecting process.
Figure 3B:
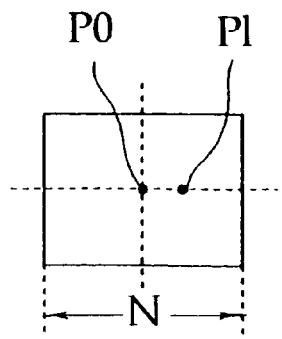
Figure 3C:
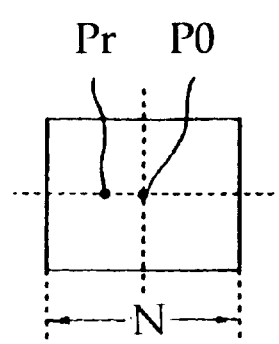
FIG. 3, comprising

Detection of inclinations of the subject 30 in pixel units is performed in the following. Since pixels corresponding to each other in the left and right image are known from said parallax, a luminance ratio of the corresponding pixels is computed. And a surface inclination of a minute part (also called an observed part) on the subject 30 is computed on the basis of the luminance ratio. These processes are concretely described with reference to FIGS. 3(A) to 3(C). FIG. 3(A) shows arrangement of the subject 30 and the two cameras 11a and 11b, and a state of lights entering the two cameras 11a and 11b from an observed part 30a of the subject 30. FIG. 3(B) is a figure for explaining a pixel position corresponding to said observed part 30a on the gradational image obtained by the left camera 11a. FIG. 3(C) is a figure for explaining a pixel position corresponding to said observed part 30a on the gradational image obtained by the right camera 11b.

An observed part on the subject 30 is represented by number 30a, and Lambert's cosine law is applied to it. Namely, an inclination detecting method is applied which utilizes that luminances entering the two cameras 11a and 11b from the observed part 30a vary in intensity according to a surface inclination of the observed part 30a. Thereupon an incident light L1 entering the left camera 11a from the observed part 30a and a incident light Lr entering the right camera 11b from the observed part 30a can be, respectively, represented by the following expressions (1) and (2);

$$L1 = L0 \times \cos(\beta + \theta 1) \cos \psi \qquad (1)$$

$$Lr = L0 \times \cos(\beta + \theta r) \cos \psi \qquad (2),$$

where β is an inclination angle of the observed part 30a on the subject 30.

In this case, the inclination angle β is considered as an angle which a normal line of the surface of the observed part 30a of the subject 30 makes with the respective optical axes of the cameras. And ψ is an angle which the line of sight of the camera (namely, its optical axis) makes with the subject (therefore this is the same as β). And θ1 is an angle which the optical axis of the left camera 11a makes with the line drawn through the left camera 11a and the observed part 30a, and θr is an angle which the optical axis of the right camera 11b makes with the line drawn through the right camera 11b and the observed part 30a.

A factor to be found is the inclination angle β of the subject. Since L0 is unknown, it is standardized by taking a ratio of L1 and Lr by means of the expressions (1) and (2).

$$L1/Lr = \{L0 \times \cos(\beta + \theta l)\} / \{L0 \times \cos(\beta + \theta r)\} \qquad (3)$$

$$= \cos(\beta + \theta l) / \cos(\beta + \theta r).$$

Since the L1/Lr is an output ratio, namely, a density ratio of pixels corresponding to each other in the left and right image, the expression (3) is rewritten by representing this density ratio as H in the following;

$$L1/Lr = H \qquad (4)$$

$$= \cos(\beta + \theta l) / \cos(\beta + \theta r).$$

When transforming the expression (4) the following expression (5) is obtained;

$$H \cos(\beta + \theta r) = \cos(\beta + \theta 1) \qquad (5).$$

The expression (5) is transformed as follows;

$$H(\cos\beta\cos\theta r - \sin\beta\sin\theta r) = \cos\beta\cos\theta l - \sin\beta\sin\theta l. \qquad (6)$$

The expression (6) is transformed as follows;

$$\cos \beta (H \cos \theta r - \cos \theta 1) - \sin \beta (H \sin \theta r - \sin \theta 1) = 0 \qquad (7)$$

And the expression (7) is transformed as follows;

$$\cos \beta (H \cos \theta r - \cos \theta 1) = \sin \beta (H \sin \theta r - \sin \theta 1) \qquad (8).$$

And furthermore, the expression (8) is transformed as follows;

$$(H\cos\theta r - \cos\theta l) / (H\sin\theta r - \sin\theta l) = \sin\beta / \cos\beta = \tan\beta. \qquad (9)$$

The θ1 in the expression (9) can be obtained from a pixel position P1 corresponding to the observed part 30a in the left image, and the θr can be obtained from a pixel position Pr corresponding to the observed part 30a in the right image. Namely, as shown in FIG. 3(B), the observed part 30a on the line of sight making an angle θ1 with the optical axis of the camera 11a appears on a pixel position P1 in an image which is composed of N pixels and has an angle of view α. Accordingly, the angle θ1 to give the pixel position P1 can be given by the following expression (a);

$$\theta 1 = \tan^{-1}\{\{2(P1-P0)/N\} \times \tan(\alpha t/2)\} \qquad (a),$$

where P0 is the central pixel position of the image. As shown in FIG. 3(C), the observed part 30a on the line of sight making an angle θr with optical of the camera 11b appears on a pixel position Pr in an image which is composed of N pixels and has an angle of view α. Accordingly, the angle θr to give the pixel position Pr can be given by the following expression (b);

$$\theta r = \tan^{-1}\{\{2(Pr-P0)/N\} \times \tan(\alpha/2)\} \qquad (b).$$

As clearly known from the expressions (9), (a), and (b), it can be understood that the inclination angle β of the observed part 30a of the subject 30 is obtained on the basis of a luminance ratio of the left and the right image, concretely, on the basis of a luminance ratio of pixels corresponding to each other in the left and the right image, the angle of view α of the cameras 11a and 11b, the pixel positions of the corresponding pixels in the left and the right image, and the image size or a number of pixels N of the left and the right image. Since the luminance value L1 of the left image or the luminance value Lr of the right image relates to a plus or minus of the inclination of a pixel surface, it will do to determine which should be a numerator and which should be a denominator in advance, and therefore this is not an essential problem.

And the observed part 30a of the subject 30 is successively shifted to another position and its inclination angle is detected in the same procedure as described above. In this way, surface inclinations of the subject 30 can be detected in pixel units. The surface inclinations of the subject detected in pixel units are stored in the inclination storing means 17.

Figure 4A:
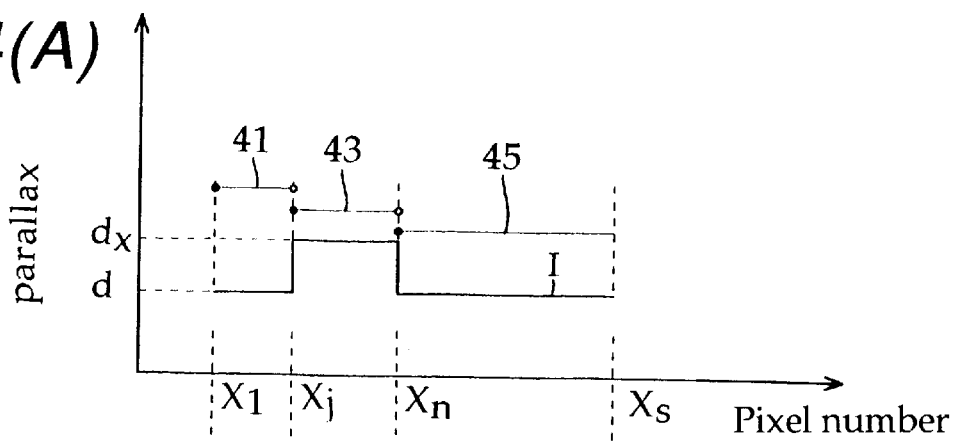
FIGS. 4(A), 4(B) and 4(C), is a diagram for explaining an integral interval determining process.

Next, an integral interval is determined. This is described with reference to FIG. 4. First, the integral interval determining means 19 scans the parallax storing means 13c, and extracts the coordinates of a group of pixels which show the same parallax appear in succession in a domain. Here, a group of pixels showing the same parallax means a group of pixels having a fixed parallax such as a pixel group having a fixed parallax of 3 or a pixel group having a fixed parallax of 5. Furthermore, a pixel group having parallaxes in such a somewhat wide range as 3 to 5 or 6 to 8 also may be specified as a pixel group having the same parallax. The I in FIG. 4(A) shows an example in which a group of pixels $X_1$ to $X_{j-1}$ being d in parallax, a group of pixels $X_j$ to $X_{n-1}$ being dx in parallax, and a group of pixels $X_n$ to $X_{s-1}$ being d in parallax appear in succession. In an example of I in FIG. 4(A), a group of pixels $X_1$ to $X_{j-1}$ corresponds to a first integral interval 41, a group of pixels $X_j$ to $X_{n-1}$ corresponds to a second integral interval 43, and a group of pixels $X_n$ to $X_s$ corresponds to a third integral interval 45.

Next, the integral interval determining means 19 outputs to the integrating means 21 the coordinates of pixels in each domain in which the pixels showing the same parallax appear in succession.

Figure 4B:
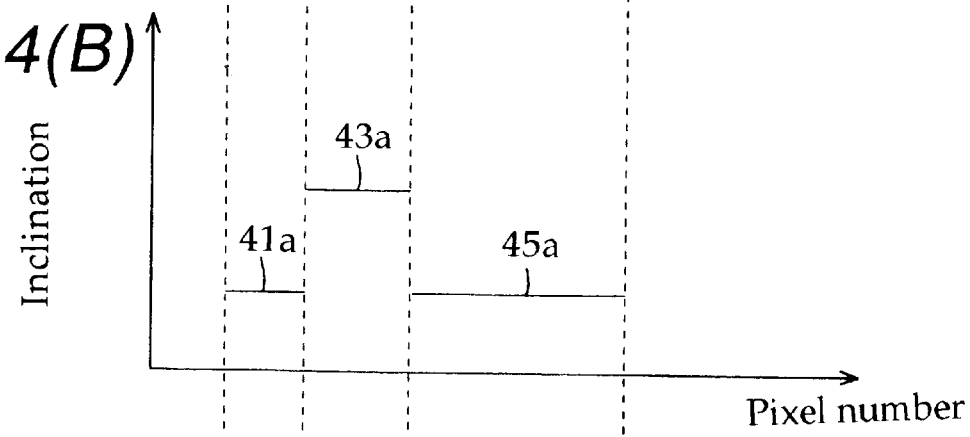
Figure 4C:
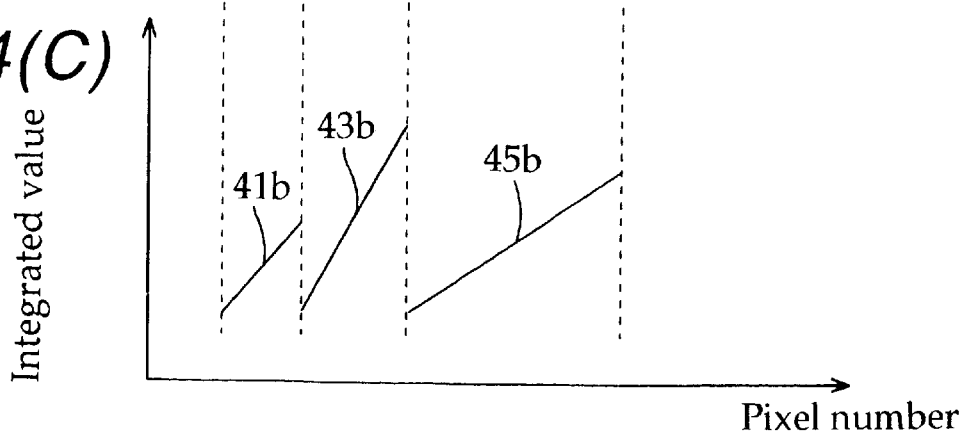

On the basis of the said coordinates inputted from the integral interval determining means 19, the integrating means 21 takes in inclinations of the subject 30 corresponding to these pixel groups from the inclination storing means 17 and integrates these inclinations. In FIG. 4(B), numbers 41a, 43a, and 45a show respectively inclinations of a group of pixels $X_1$ to $X_{j-1}$, inclinations of a group of pixels $X_j$ to $X_{n-1}$, and inclinations of a group of pixels $X_n$ to $X_s$. And in FIG. 4(C), numbers 41b, 43b, and 45b show respectively the results of integration in the integral intervals 41 to 45. Here, although it is described that each domain in which pixels showing the same parallax appear in succession is an integral interval, the integration is performed individually for each scanning line. In case that a domain where pixels showing the same parallax appear in succession stretches over two or more scanning lines, the integration is performed separately for each of the scanning lines. When an integral interval has been shifted to another integral interval, the integrating means 21 starts integrating inclinations of the new integral interval. And after resetting an integral value at zero at the beginning of a new integration (see the boundary part between 41b and 43b in FIG. 4(C), and the boundary part between 43b and 45b), the integrating means 21 integrates the new integral interval.

Figure 5A:
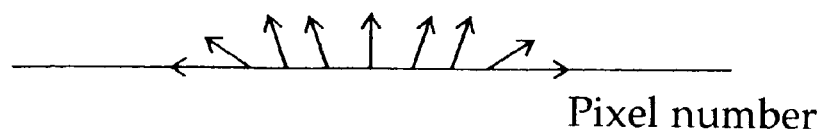
FIGS. 5(A) and 5(B), is a diagram for showing an example of restriction of a shape.
Figure 5B:
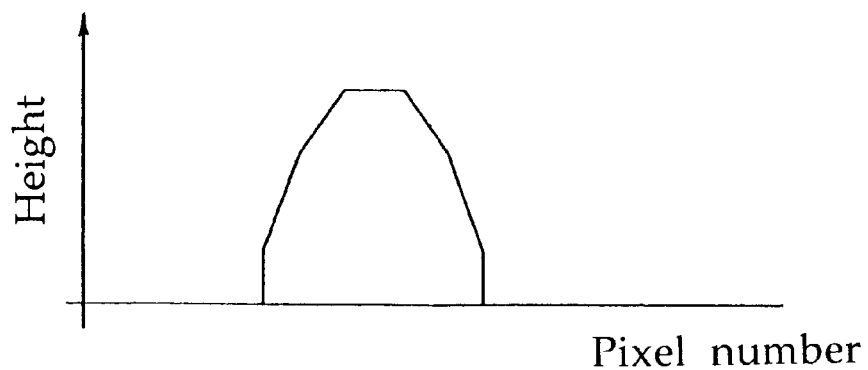

In order to have the invention more deeply understood, FIG. 5 shows another example of integration results. This shows that in case inclinations of plural pixels inside an integral interval (exactly speaking, plural observed parts on the subject) are as shown in FIG. 5(A), a shape of projection as shown in FIG. 5(B) is obtained by integrating these inclinations. The shape of projection is obtained from directions of the normal lines. In this case, the arrows in FIG. 5(A) show inclinations of plural observed parts on the subject by means of the directions of normal lines of the observed parts. Since a surface perpendicular to a normal line is an inclination surface of each part on the subject and a unit length of one pixel is known, a shape can be reconstructed as shown in FIG. 5(B) by arranging one by one the respective inclinations along a row of the pixels.

A method and an apparatus for reconstructing a shape according to this first embodiment determine an integral interval for integrating inclinations on the basis of parallaxes in stereoscopic images. Accordingly, since an extra interval determining process as required in the prior art (such as a two-level process or a process using a reflectivity map as described above) can be made unnecessary, problems which have happened up to now can be prevented. For example, since parts different in color on a subject can be considered as having the same parallax as each other, these parts can be treated as the parts being inside one integral interval. Since the invention dispenses with a reflectivity map, it can be applied to various subjects and various photographing environments. Since it is not necessary to set a light source at plural positions and compute a light source position as a parameter, composition of the apparatus can be simplified. And since one end of a domain in which pixels showing the same parallax appear in succession becomes an integration starting point and an integral path can be determined so easily that it may be, for example, a path along a scanning line, both of an integration starting point and an integral path can more easily determined in comparison with up to now.

A shape reconstructing method of the invention can be combined with the following process, for example. That is to say, the method is combined with a process of detecting a vertical distance D from the line segment connecting the cameras 11a and 11b to an observed part 30a on the subject 30 by means of the principle of a stereoscopic imaging method and a triangulation method. This is concretely described in the following.

Figure 6:
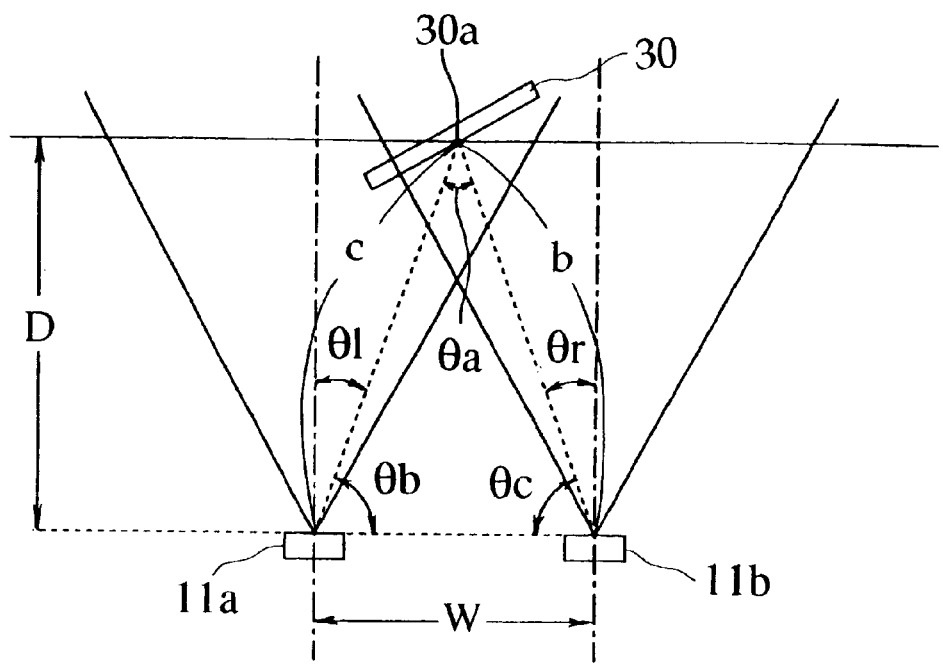
FIG. 6 is a diagram for explaining a distance value computing process.

As shown in FIG. 6, from the law of sines, the following expression;

w/sin θa=b/sin θb=c/sin θc is obtained, where θa, θb, and θc are, respectively, interior angles of a triangle composed of the camera 11a, the camera 11b, and the observed part 30a on the subject 30. And b and c are lengths of the other sides excluding a distance w between the cameras in the triangle. Accordingly, the following expression (i);

$$b=(w/\sin \theta a)\times \sin \theta b \quad \text{(i)}$$

is obtained. The distance D to be detected is obtained for example as the following expression (ii);

$$D=b\times \sin \theta c \quad \text{(ii).}$$

Thereupon, substituting the expression (i) for b in the expression (ii), $$D=(w\times \sin \theta b\times \sin \theta c)/\sin \theta a \quad \text{(iii)}$$

is obtained.

In these expressions, $\theta b=\pi/2-\theta 1$, $\theta c=\pi/2-\theta r$, and $\theta a=\pi-\theta b-\theta c$. The $\theta 1$ and $\theta r$ are given by the said expressions (a) and (b). Accordingly, the distance D can be obtained.

Even a fine ruggedness can be reconstructed by superposing on each other a distance D obtained in this way and inclinations obtained by the method of the invention.

For example, in case that a distance between a subject and cameras is about 1 m, the camera's angle of view is about 13 degrees, an interval between the two cameras is about 6.5 cm, and the camera's CCD has pixels of 640×480 or so, only an existing technique of reconstructing a shape by means of a stereoscopic imaging method and a triangulation method can have a distance resolution of only at least several centimeters and can only give a flat image in case of measuring a person's face and the like, but a rugged part such as its nose and the like can be obtained by superposing an inclination value obtained by a method of the invention on an inclination value obtained by the existing method.

2. Second Embodiment

Figure 7:
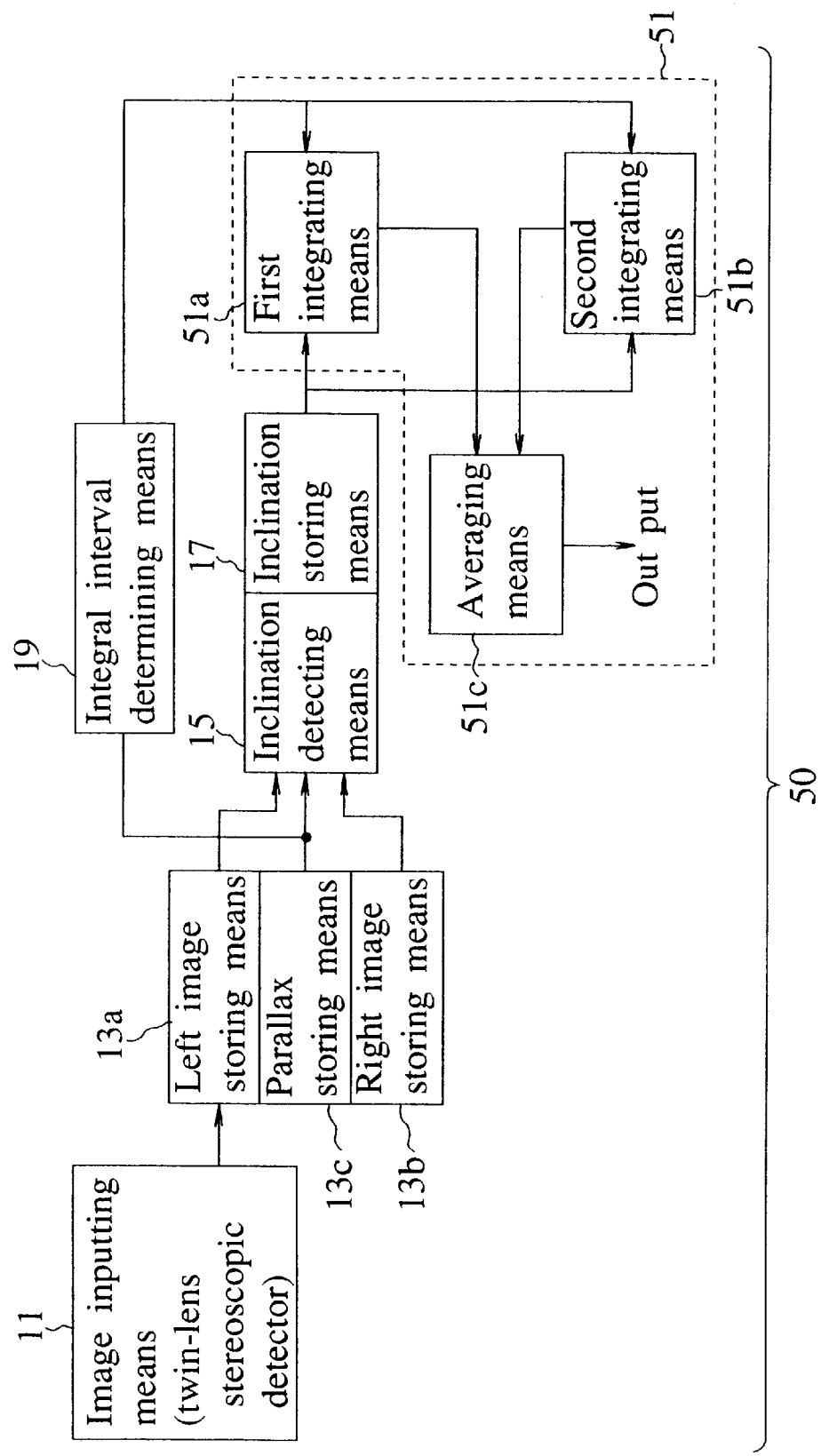
FIG. 7 is a block diagram for explaining an apparatus according to a second embodiment.

The first embodiment has only integrated inclination values inside an integral interval along a scanning direction after determining the integral interval. However, the integrating method may be devised so as to reduce unbalance of integral errors. The second embodiment is an example of it. FIG. 7 is a block diagram showing a shape reconstructing apparatus 50 suitable for implementing this. This apparatus 50 is different in an integrating means 51 from an apparatus of the first embodiment.

The integrating means 51 is provided with a first integrating means 51a for integrating inclinations from one end to the other end of an integral interval, a second integrating means 51b for integrating inclinations from the said other end to the said one end of the integral interval, and an averaging means 53 for taking an average value of integrated results of pixels having the same pixel number as each other in relation to the integrated results in both of these directions and taking the average value as the final integrated result. This integrating means 51 can be also composed of a computer for example. Operation of the apparatus 50 of the second embodiment is concretely described with reference to FIG. 8.

Detection of a parallax of each pixel, detection of inclinations on a subject in pixel units, and determination of an integral interval are respectively performed in the same procedure as the first embodiment.

Figure 8A:
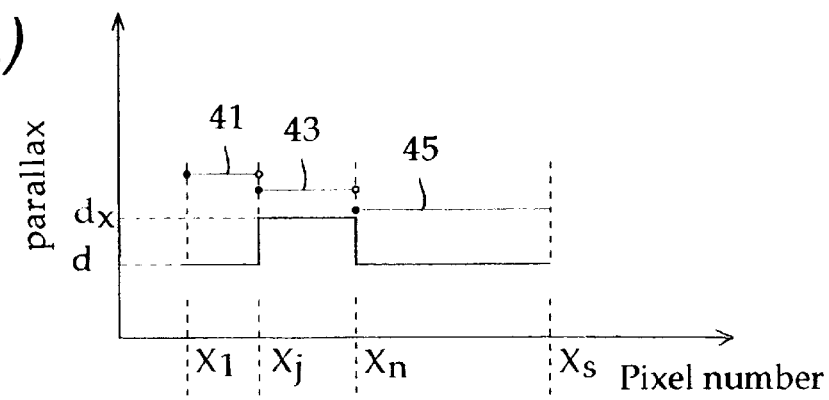
FIGS. 8(A), 8(B) and 8(C), is a diagram for explaining a shape reconstructing method according to a second embodiment.
Figure 8B:
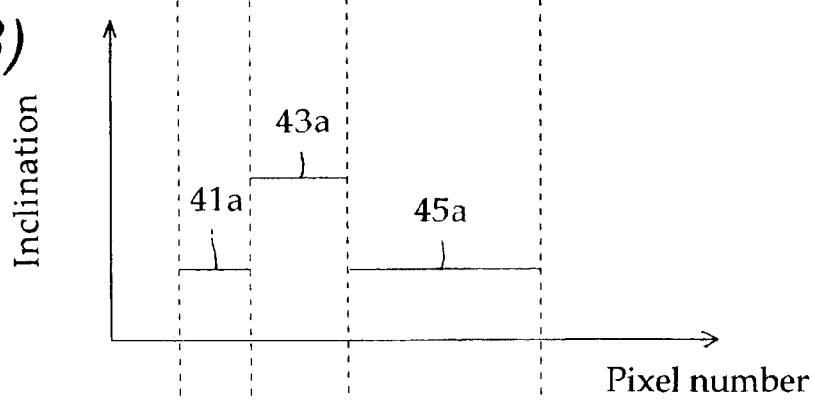
Figure 8C:
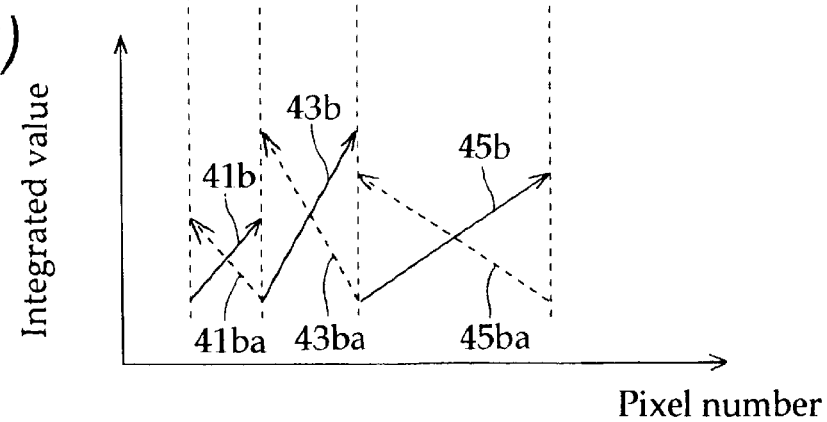

When integrating inclinations (FIG. 8(B)) in pixel units inside the respective integral intervals 41 to 45 determined as shown in FIG. 8(A), these integral intervals are integrated in both directions, for example, from the right to the left and from the left to the right. The integrations in both directions may be performed at the same time or may be performed one after another. And the integrations in the integral intervals 41 to 45 may be performed in parallel with one another. Next, an average value of integrated results of pixels having the same pixel number as each other is taken in relation to the integrated results in both of these directions. And the average value is taken as the final integrated result. In FIG. 8(C), numbers 41b, 43b, and 45b show results obtained by integrating the respective integral intervals from the left end to the right end, and numbers 41ba, 43ba, and 45ba show results obtained by integrating the respective integral intervals from the right end to the left end.

In FIG. 8(C), although the right-upward integrated results 41b, 43b and 45b, and the left-upward integrated results 41ba, 43ba and 45ba are shown for explanation, this is convenient for explanation and the left-upward integrated results 41ba, 43ba and 45ba are represented with negative values to be used in computation of average values.

Figure 9:
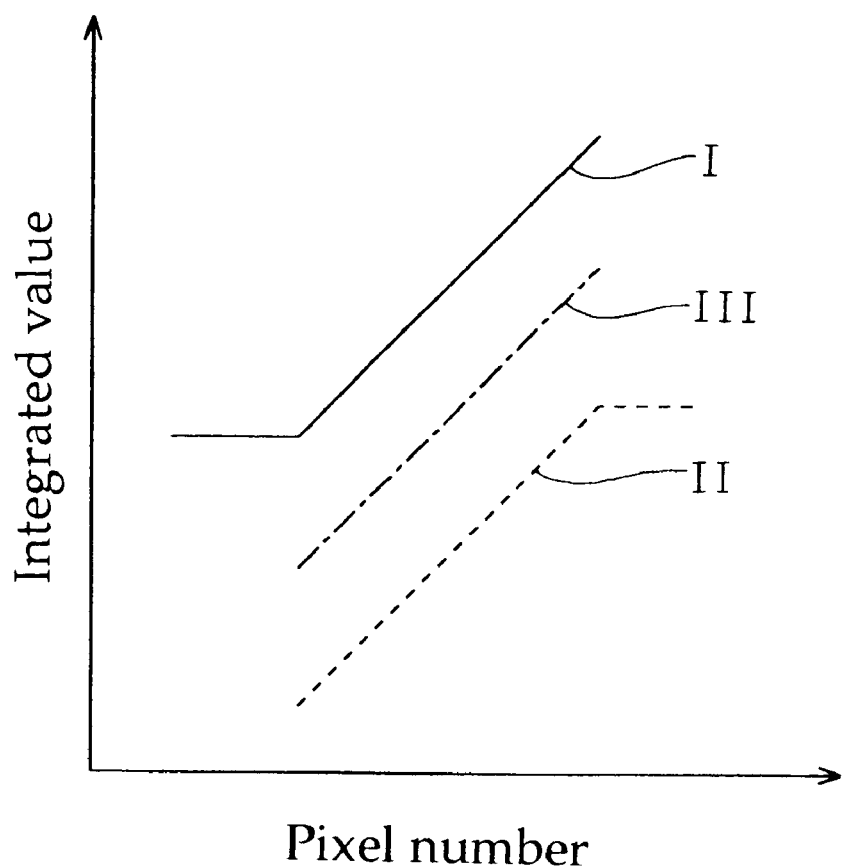
FIG. 9 is another diagram for explaining a shape reconstructing method according to a second embodiment.

This state is shown in FIG. 9. In FIG. 9, a solid line I shows a result obtained by integrating an integral interval from the left end to the right end, a dot-dush line II shows a result obtained by integrating an integral interval from the right end to the left end, and a dot line III shows a result obtained by averaging the results obtained by integration in both directions. The second embodiment can make distribution of integral errors more uniform in comparison with the first embodiment, since the second embodiment performs integration from the directions opposite to each other, adds these results of integration to each other for pixels having the same pixel number as each other, and takes an average of these results of integration. Accordingly, the second embodiment can reduce unbalance caused by integral errors of the integrated results in comparison with the first embodiment.

Although the embodiments for implementing a shape reconstructing method and a shape reconstructing apparatus according to the present invention have been described above, the invention is not limited to the above-mentioned embodiments.

For example, when finding a luminance ratio of pixels corresponding to each other, an average luminance of pixels of n×n around an observed pixel may be set as the luminance of the observed pixel. A so-called moving average process is performed. By this, influence of noises can be reduced. And a luminance ratio may be quantized and treated as gradation.

Although in the above-mentioned descriptions a twin-lens stereoscopic imaging method has been used, a multi-lens stereoscopic imaging method using three or more lenses may be applied. In such a case, it is a matter of course that since it will do to think of a set of images 1 to n obtained at the respective positions the invention can be also applied to such a case.

And it is apparent that the technique of the invention can be applied after obtaining distance images or parallaxes by means of a means other than a stereoscopic camera. As an example of the former, there is a method of obtaining gradational images from plural positions by moving a camera.

As clearly known from the above descriptions, according to a shape reconstructing method according to the present invention, a method for detecting inclinations of a subject in pixel units and reconstructing a shape of said subject by integrating the detected inclinations photographs said subject from at least two positions, and obtains in pixel units parallaxes for said subject between these positions, and then determines integral intervals for said integration on the basis of said parallaxes. Therefore, this method can determine an integral interval without using a two-level process for determining an integral interval or a reflectivity map. This method can avoid problems in the prior art using a two-level process or a reflectivity map.

And according to a shape reconstructing apparatus according to the invention, the above-mentioned reconstructing method can be easily implemented.

What is claimed is:

1. A method of reconstructing a shape of a subject comprising:

photographing the subject from two different positions to obtain two images;

determining parallaxes between the two images in pixel units;

for each pair of pixels, one from each of the two images, that correspond to the same position on the subject, determining the ratio of the luminance of one of the pair of pixels to the luminance of the other of the pair of pixels;

determining inclinations of the subject based on the luminance ratios, determining integral intervals based on the parallaxes; and integrating the inclinations based on the integral intervals.

2. A method as defined in claim 1, wherein each integral interval is a set of successive pixels having the same parallax.

3. A method as defined in claim 1, wherein said integrating includes for each integral interval:

integrating the inclinations from one end of the integral interval to the other end of the integral interval, to obtain a first integration result;

integrating the inclinations from the other end to the one end, to obtain a second integration result; and averaging the first and second integration results.

4. A method as defined in claim 1, wherein each integral interval is a set of successive pixels in the same parallax range.

5. A method of reconstructing a shape of a subject comprising:

obtaining two images of the subject taken from two different positions;

determining parallaxes between the two images in pixel units;

for each pair of pixels, one from each of the two images, that correspond to the same position on the subject, determining the ratio of the luminance of one of the pair of pixels to the luminance of the other of the pair of pixels;

determining inclinations of the subject at positions to which the pairs of pixels correspond, based on the luminance ratios, determining from the determined parallaxes, sets of successive parallax pixels, the parallax pixels of each set having a corresponding same parallax or being in a corresponding same parallax range; and integrating the inclinations based on the sets of successive parallax pixels.

6. An apparatus for reconstructing a shape of a subject, comprising:

means for photographing the subject from two different positions to obtain two images;

means for determining parallaxes between the two images in pixel units;

for each pair of pixels, one from each of the two images, that correspond to the same position on the subject, means for determining the ratio of the luminance of one of the pair of pixels to the luminance of the other of the pair of pixels;

means for determining inclinations of the subject based on the luminance ratios;

means for determining integral intervals based on the parallaxes; and, means for integrating the inclinations based on the integral intervals.

7. An apparatus as defined in claim 6, wherein said integrating means comprises:

means for integrating the inclinations from one end to the other end of each integral interval, to obtain respective first integration results;

means for integrating the inclinations from the other end to the one end of each integral interval, to obtain respective second integration results; and means for averaging the respective first and second integration results for each integral interval.

8. An apparatus as defined in claim 6, wherein said integral interval determining means determines sets of successive pixels, the pixels of each set having a corresponding same parallax.

9. An apparatus as defined in claim 6, wherein said integral interval determining means determines sets of successive pixels, the pixels of each set being in a corresponding parallax range.

10. An apparatus as defined in claim 6, wherein said inclinations determining means comprises means for determining inclinations of the subject at positions to which the pairs of pixels correspond, based on the luminance ratios, wherein said integral intervals determining means comprises means for determining from the determined parallaxes, sets of successive parallax pixels, the parallax pixels of each set having a corresponding same parallax or being in a corresponding same parallax range, and wherein said integrating means comprises means for integrating the inclinations based on the sets of successive parallax pixels.

* * * * *